March 13, 1951 J. E. SEEBOLD 2,545,314
HYDROCHLORIC ACID RECOVERY
Filed Feb. 12, 1943 2 Sheets-Sheet 1

James E. Seebold
INVENTOR.

BY Cleveland B. Killabrough
ATTORNEY

March 13, 1951     J. E. SEEBOLD     2,545,314
HYDROCHLORIC ACID RECOVERY
Filed Feb. 12, 1943     2 Sheets—Sheet 2
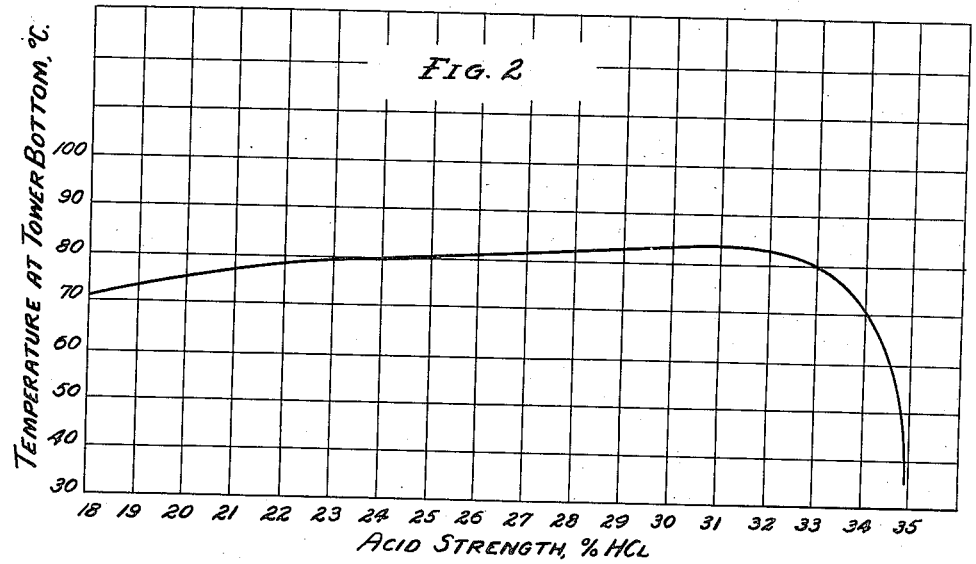
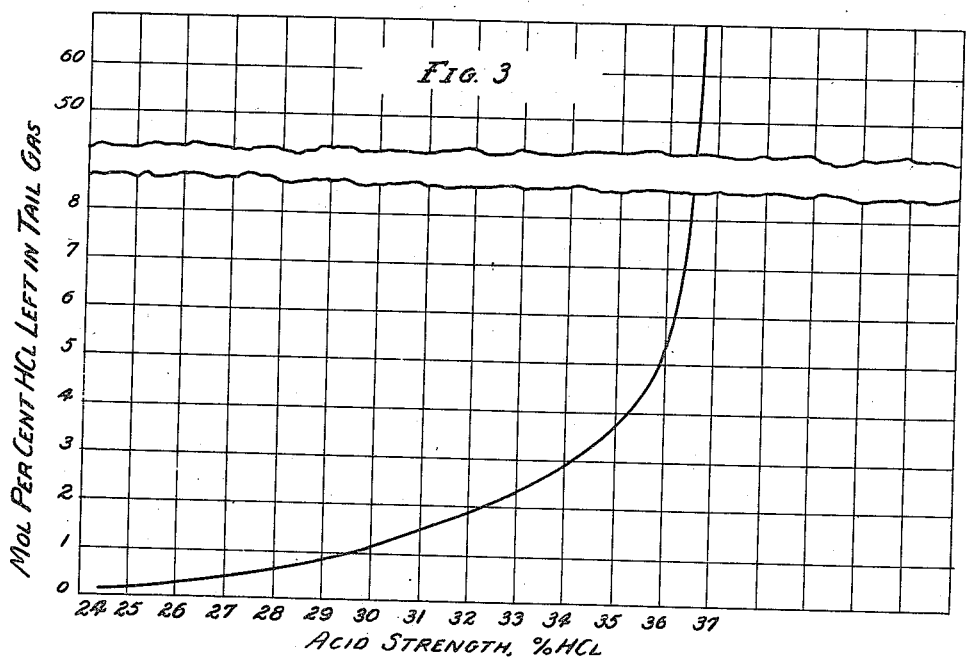
James E. Seebold
INVENTOR.
BY    Cleveland B. Hallabaugh
ATTORNEY Patented Mar. 13, 1951

2,545,314

UNITED STATES PATENT OFFICE 2,545,314

HYDROCHLORIC ACID RECOVERY

James Edward Seebold, Chicago, Ill., assignor to Hercules Powder Company, Wilmington, Del., a corporation of Delaware Application February 12, 1943, Serial No. 475,624

2 Claims. (Cl. 23—154)

This invention relates to the manufacture of hydrochloric acid and more particularly to the manufacture of hydrochloric acid by absorption from waste gases containing hydrogen chloride.

In one method for the manufacture of hydrochloric acid, hydrogen chloride is first formed in any suitable manner as by the reaction between sodium chloride and sulfuric acid or it may result as a by-product in the manufacture of organic chlorinated materials as, for example, chlorinated rubber. The hydrogen chloride is then absorbed in water or dilute acid.

Hydrogen chloride is absorbed in water when its partial pressure in the gaseous phase is greater than that in the liquid phase and absorption continues until the partial pressure in the gaseous phase is equal to the vapor pressure of the gas in solution. To have this difference in partial pressures, at high acid concentrations, either the gases must have a high hydrogen chloride concentration or the liquid must have a low temperature or both. Where the hydrogen chloride content of the gas is low, the gas-liquid equilibrium point is reached at a low acid concentration and means for removing the heat of solution, which for the absorption of hydrogen chloride in water is very large, must be provided in order to obtain further absorption.

Modern practice involves the use of packed absorption towers provided with suitable cooling means and wherein a gas containing hydrogen chloride is brought into countercurrent contact with the absorbent acid solution or with water. One or more absorbers may be used suitably connected to give the desired result. The tower packing must be kept wet either by the introduction of water or by recirculating some of the acid effluent back to the absorber or both.

Equipment now in use for the absorption of hydrogen chloride is, however, subject to the disadvantage that the provision of cooling means is quite expensive since the cost of suitable materials is high. Furthermore, provision for cooling complicates the construction and maintenance of the equipment, thus adding to the cost. If cooling is to be effected in the absorption tower itself, it is necessary to construct the tower of materials having a high heat conductivity, such as the more expensive acid resisting metals.

Now in accordance with the present invention, gases rich in hydrogen chloride may be passed through an absorption tower without external cooling means of such size, velocity and temperature that 20° Baumé hydrochloric acid is produced. No external cooling means is used. In the absorption tower, the heat of absorption of the gas causes the formation of steam, which formation in turn reduces the temperature of the rest of the liquid so that the high concentration of hydrochloric acid is formed.

Having now indicated in a general way the nature and purpose of the invention, there follows a more detailed description of the preferred embodiments thereof with reference to the accompanying drawings in which:

Figure 2 is a graph showing an observed relationship between the temperature of the liquid at the bottom of the tower and the acid strength; and Figure 3 is a graph showing an observed relationship between the percentage of hydrogen chloride left in the tail gas and the strength of the acid produced.

Figure 1:
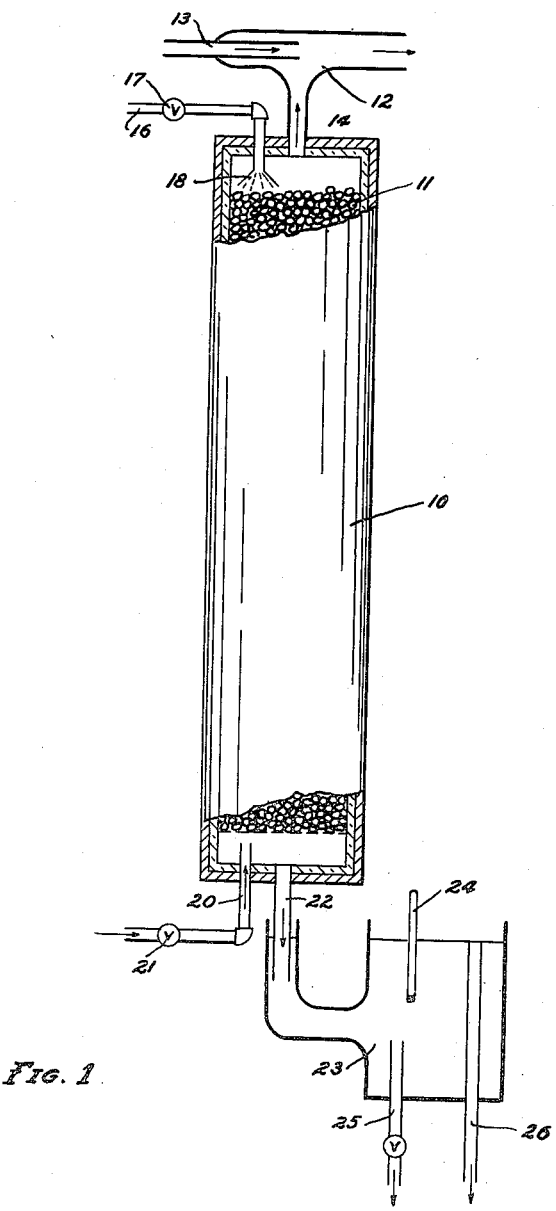
Figure 1 is a perspective view of an absorption tower for use with the present process.

In Figure 1 is shown an elongated cylindrical tower 10, which is preferably made of iron, and lined with glass. The tower is packed substantially its full length with Raschig rings or the like 11. At the top of the tower is the steam ejector 12, which may be used as needed, through which steam is passed out of the steam jet 13, thereby creating a partial vacuum in the line 14. The steam from the ejector 12 together with the tail gases may be passed through a condenser not shown, or allowed to escape. Also, at the top of the tower is the water supply 16 controlled by valve 17 and having a spray head 18.

In the bottom of the tower is the gas inlet connection 20 controlled by valve 21 and the acid recovery pipe 22, which leads to the hydrometer float box 23, wherein the hydrometer 24 is used to check the quality of the acid. The hydrometer float box is provided with outlet 25 for the removal of any material which may separate, such as carbon tetrachloride, and outlet 26 for the removal of the acid to carboys or other storage. This product acid may be cooled in a suitable external cooler if desired.

Substantially pure hydrogen chloride may be used but the invention contemplates the use also of by-products of the chlorination of organic materials, such as chlorinated rubber, which contain substantial amounts of hydrogen chloride and preferably more than 60% in order to obtain a hydrochloric acid of about 20° Baumé (about 32% HCl). Cold water is used for absorbing the gas, but the heat absorption will cause the vaporization of a part of the water at one point in the tower, which vaporization results in a cooling of the fluid. The space velocity of the gas and the temperature of the entering gas and water may be so adjusted as to result in a certain temperature and strength of the acid leaving the bottom of the tower. An observed relationship between this temperature at the bottom of the tower, and the acid strength is shown in the graph at Figure 2. From this graph it will be seen that the temperature at the bottom of the tower can in most cases be held below about 90° C. for most acid strengths. The acid strengths between 34 and the equilibrium point, which is about 37, are obtained with much cooler solutions, but tend to result in a very great amount of the hydrogen chloride being left in the tail gas as is indicated in Figure 3, where an observed relationship between this hydrogen chloride left in the tail gas and the resultant acid strength are compared.

The following is an example of a method of carrying out the process:

*Example*

An absorption tower substantially of the design shown in Figure 1 was set up comprising a glass lined steel pipe of 3″ inside diameter and lagged for its entire 10′ length with 1½″ insulation. The pipe was packed to a height of 9′ with ½″ Raschig rings. A steam ejector was used for drawing the gases upward through the column and the absorbing water was allowed to flow countercurrent to the gases by gravity. The gases were admitted at the bottom of the tower and the acid withdrawn. A gas containing 69.2% hydrogen chloride at a temperature of about 25° C. was passed into the bottom of the tower. Water at a temperature of about 25° C. was admitted to the top of the tower and the gas passed upwardly through it by means of the steam jet ejector at a velocity of about 1′ per second. In a short time, the liquid at the bottom of the tower had a temperature of about 70° C. The hydrochloric acid withdrawn contained about 32% hydrogen chloride and the tail gases contained about 2.5% of hydrogen chloride.

Various concentrations of hydrogen chloride may be used in the entering gas, but, in order to obtain a commercial concentration of hydrochloric acid (about 32%) in a single pass, it is preferable that the entering gas contain at least 60% of hydrogen chloride.

The velocity of the gas in the tower may be varied, but for the best yields a velocity of from about 0.5 ft./sec. to 3 ft./sec. should be used and preferably about 1 ft./sec. for a contact time of from about 5 to about 15 seconds and preferably for about 10 seconds.

The temperature of the entering gas may also be varied from about 0° C. to about 50° C. but should preferably be at about 25° C. In addition, the temperature of the entering water may be varied from about 0° C. to about 100° C. but should also be preferably about 25° C. The velocity of the gas and the water rate should be so adjusted that the temperature at the bottom of the tower does not exceed about 90° C. and preferably from about 40° to about 70° C.

This application is a continuation-in-part of my application for United States Letters Patent, Serial No. 381,287, filed March 1, 1941, now abandoned.

What I claim and desire to protect by Letters Patent is:

1. A process for the manufacture of hydrochloric acid which comprises supplying water at a temperature substantially below 100° C., to the upper portion of an uncooled absorption tower, supplying a gas rich in hydrogen chloride to the lower portion of the absorption tower at a temperature substantially below 90° C., passing the hydrogen chloride containing gas upwardly through the absorption tower countercurrent to the flow of water therethrough whereby the hydrogen chloride gas is absorbed by the water, controlling the rate of flow of the water, the rate of flow of said gas, and the temperatures thereof so as to maintain the temperature within the tower at the entrance point of the gas substantially below 90° C. and the strength of the acid obtained at least about 20° Bé. (about 32%) allowing the heat of absorption of the hydrogen chloride in the water to evaporate a portion of the water in the tower, applying partial vacuum to evaporate additional water and to withdraw an amount of water vapor from the upper portion of the tower which contains as latent heat of vaporization an amount of heat which is a substantial proportion of the heat of absorption evolved in the tower, and withdrawing from the bottom of the tower an acid with a concentration of at least about 32% by weight of hydrogen chloride.

2. A process for the manufacture of strong hydrochloric acid which comprises flowing a gas containing more than 60% by weight hydrogen chloride at a temperature of about 25° C. to the bottom of an uncooled absorption tower, supplying water at a temperature of about 25° C. to the top of the absorption tower in flow countercurrent to the said gas, allowing the heat of absorption of the hydrogen chloride in the water to evaporate a portion of the water in the tower, applying partial vacuum to evaporate additional water and to withdraw water vapor containing as latent heat essentially this heat of absorption, the relative rate of water and hydrogen chloride gas being such that the liquid leaving the bottom of the tower has a temperature of about 70° C., and withdrawing hydrochloric acid of about 32% concentration at about 70° C. from the bottom of the tower.

JAMES EDWARD SEEBOLD.

REFERENCES CITED

The following references are of record in the file of this patent:

UNITED STATES PATENTS

| Number | Name | Date |
|---|---|---|
| 1,831,474 | Ayres | Nov. 10, 1931 |
| 1,932,954 | Conradtly | Oct. 31, 1933 |
| 2,047,611 | Baxter | July 14, 1936 |
| 2,127,571 | Pardee | Aug. 23, 1938 |

FOREIGN PATENTS

| Number | Country | Date |
|---|---|---|
| 408,578 | Great Britain | Apr. 9, 1934 |
| 503,220 | Great Britain | Mar. 27, 1939 |

OTHER REFERENCES

Lunge: Sulfuric Acid & Alkali, vol. II, part I, pp. 310-312, Guerney & Jackson, London, England.